(12) United States Patent
Shei

(10) Patent No.: US 11,206,946 B2
(45) Date of Patent: Dec. 28, 2021

(54) HEAT TRANSFER SYSTEM

(71) Applicant: Prince Castle LLC, Carol Stream, IL (US)

(72) Inventor: Steven Shei, Fort Wayne, IN (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 214 days.

(21) Appl. No.: 16/360,495

(22) Filed: Mar. 21, 2019

(65) Prior Publication Data

US 2019/0290063 A1    Sep. 26, 2019

Related U.S. Application Data

(60) Provisional application No. 62/646,093, filed on Mar. 21, 2018.

(51) Int. Cl.
| | |
|---|---|
| A47J 37/04 | (2006.01) |
| A47J 37/06 | (2006.01) |
| A21B 1/28 | (2006.01) |
| A21B 1/24 | (2006.01) |
| A21B 1/22 | (2006.01) |
| A21B 1/48 | (2006.01) |
| F24C 15/32 | (2006.01) |
| F24C 15/00 | (2006.01) |

(52) U.S. Cl.
CPC ............. *A47J 37/0682* (2013.01); *A21B 1/22* (2013.01); *A21B 1/245* (2013.01); *A21B 1/28* (2013.01); *A21B 1/48* (2013.01); *A47J 37/045* (2013.01); *F24C 15/001* (2013.01); *F24C 15/322* (2013.01)

(58) Field of Classification Search
CPC ... A47J 37/0682; A47J 37/045; F24C 15/001; F24C 15/322; A21B 1/245; A21B 1/22; A21B 1/48

USPC ............................................. 126/41 R, 21 A
See application file for complete search history.

(56) References Cited

U.S. PATENT DOCUMENTS

| | | | |
|---|---|---|---|
| 2,113,544 A | 4/1938 | Haley | |
| 2,155,654 A | 4/1939 | Haley | |
| 3,455,640 A | 7/1969 | White | |
| 3,476,491 A | 11/1969 | Pipes et al. | |
| 4,121,509 A | 10/1978 | Baker et al. | |
| 4,176,589 A | 12/1979 | Stuck | |

(Continued)

FOREIGN PATENT DOCUMENTS

| | | |
|---|---|---|
| CA | 2882647 A1 | 5/2007 |
| DE | 626349 C | 2/1936 |

(Continued)

OTHER PUBLICATIONS

International Search Report and Written Opinion issued in corresponding PCT/US2019/023351, dated May 29, 2019.

*Primary Examiner* — Avinash A Savani
(74) *Attorney, Agent, or Firm* — Andrus Intellectual Property Law, LLP

(57) ABSTRACT

A heat transfer system and a broiler that includes a heat transfer system include a heat source. The heat transfer system includes a mixing chamber that surrounds the heat source. An air inlet provides a flow of pressurized air into the mixing chamber. The mixing chamber directs the flow of air past the heat source for direct heating of the flow of air by the heat source. The flow of air is further directed out of the mixing chamber through an outlet to impinge upon a food product.

18 Claims, 8 Drawing Sheets

(56) References Cited

U.S. PATENT DOCUMENTS

| | | | |
|---|---|---|---|
| 4,188,868 | A | 2/1980 | Baker et al. |
| 4,447,692 | A | 5/1984 | Mierzwinski |
| 4,664,923 | A * | 5/1987 | Wagner ............... A21B 2/00 426/233 |
| 4,701,340 | A | 10/1987 | Bratton et al. |
| 4,936,286 | A | 6/1990 | Baker |
| 4,972,824 | A | 11/1990 | Luebke et al. |
| 5,050,578 | A | 9/1991 | Luebke et al. |
| 5,172,682 | A | 12/1992 | Luebke et al. |
| 5,179,265 | A * | 1/1993 | Sheridan ............ A21B 1/245 219/388 |
| 5,206,045 | A | 4/1993 | Stuck |
| 5,253,564 | A | 10/1993 | Rosenbrock et al. |
| 5,345,923 | A | 9/1994 | Luebke et al. |
| 5,657,686 | A * | 8/1997 | Gunawardena ........ A21B 1/245 122/7 R |
| 5,906,485 | A | 5/1999 | Groff et al. |
| 5,908,574 | A | 6/1999 | Keogh |
| 5,941,235 | A | 8/1999 | Carter |
| 6,157,002 | A | 12/2000 | Schjerven, Sr. et al. |
| 6,252,201 | B1 | 6/2001 | Nevarez |
| 6,481,433 | B1 | 11/2002 | Schjerven, Sr. et al. |
| 6,655,373 | B1 | 12/2003 | Wiker |
| 6,684,875 | B1 | 2/2004 | Schjerven, Sr. et al. |
| 7,026,579 | B2 | 4/2006 | Burtea |
| 7,038,172 | B1 | 5/2006 | Stuck |
| 7,193,184 | B1 * | 3/2007 | Manning ............ A21B 1/245 219/388 |
| 7,765,918 | B2 | 8/2010 | Garniss et al. |
| 7,800,023 | B2 | 9/2010 | Burtea et al. |
| 7,921,767 | B2 | 4/2011 | Cook et al. |
| 7,997,189 | B1 | 8/2011 | Baker et al. |
| 8,033,213 | B2 | 10/2011 | Cook et al. |
| RE43,035 | E | 12/2011 | Schjerven, Sr. et al. |
| 8,076,614 | B2 | 12/2011 | Baker et al. |
| 8,087,407 | B2 | 1/2012 | Wiker et al. |
| 8,113,190 | B2 | 2/2012 | Dougherty |
| 8,272,320 | B2 | 9/2012 | Baker et al. |
| 8,281,779 | B2 | 10/2012 | Wiker et al. |
| 8,371,285 | B2 | 2/2013 | Wiker et al. |
| 8,378,265 | B2 | 2/2013 | Greenwood et al. |
| 8,413,646 | B2 | 4/2013 | Wiker et al. |
| 8,522,675 | B2 | 9/2013 | Veltrop |
| 8,735,778 | B2 | 5/2014 | Greenwood et al. |
| 8,839,714 | B2 | 9/2014 | Schjerven, Sr. et al. |
| 8,839,779 | B2 | 9/2014 | Wiker et al. |
| 8,895,902 | B2 | 11/2014 | Shei et al. |
| 8,952,298 | B2 | 2/2015 | Fietsam et al. |
| 9,074,776 | B2 | 7/2015 | Greenwood et al. |
| 9,097,430 | B2 | 8/2015 | Stanger |
| 9,411,989 | B2 | 8/2016 | Wild |
| 9,585,400 | B2 | 3/2017 | Wiker et al. |
| 9,585,401 | B2 | 3/2017 | Wiker et al. |
| 9,609,981 | B2 | 4/2017 | Schjerven, Sr. et al. |
| 9,638,427 | B2 | 5/2017 | Reese et al. |
| D796,258 | S | 9/2017 | Streckfus |
| 9,903,598 | B2 | 2/2018 | Greenwood et al. |
| 9,907,436 | B2 | 3/2018 | Reese et al. |
| 10,201,245 | B2 | 2/2019 | Streckfus |
| 2007/0137633 | A1 * | 6/2007 | McFadden ............ H05B 6/60 126/21 A |
| 2008/0302247 | A1 | 12/2008 | Magner et al. |
| 2009/0034944 | A1 | 2/2009 | Burtea et al. |
| 2009/0165778 | A1 | 7/2009 | Harter et al. |
| 2011/0272390 | A1 | 11/2011 | Jones et al. |
| 2012/0076351 | A1 * | 3/2012 | Yoon ............... F24C 7/085 382/100 |
| 2012/0294595 | A1 | 11/2012 | Veltrop et al. |
| 2013/0025472 | A1 | 1/2013 | Stanger |
| 2014/0028445 | A1 | 1/2014 | Wild |
| 2014/0130684 | A1 | 5/2014 | Reese et al. |
| 2014/0261371 | A1 * | 9/2014 | Van Camp ........... A21B 1/48 126/21 A |
| 2015/0118378 | A1 | 4/2015 | Jones et al. |
| 2015/0272387 | A1 | 10/2015 | Stanger |
| 2016/0374508 | A1 | 12/2016 | Streckfus |
| 2017/0079473 | A1 | 3/2017 | Bigott |
| 2018/0180297 | A1 | 6/2018 | Greenwood et al. |
| 2018/0235239 | A1 | 8/2018 | Reese et al. |

FOREIGN PATENT DOCUMENTS

| | | |
|---|---|---|
| DE | 29807700 U1 | 7/1998 |
| EP | 373446 A3 | 8/1990 |
| EP | 1442660 A1 | 8/2004 |
| EP | 1905305 A1 | 4/2008 |
| EP | 2217117 B1 | 4/2014 |
| WO | 1996019700 | 6/1996 |
| WO | 1999055119 A3 | 10/1999 |
| WO | 2005084722 | 9/2005 |
| WO | WO 2007136598 A2 | 11/2007 |
| WO | WO 2009049081 A1 | 4/2009 |
| WO | 2009075848 | 6/2009 |
| WO | 2011139805 | 11/2011 |
| WO | 2013016691 | 1/2013 |
| WO | 2013098628 A3 | 7/2013 |
| WO | WO 2014106653 A1 | 7/2014 |
| WO | 2015066032 A3 | 5/2015 |
| WO | 2015147823 A3 | 10/2015 |
| WO | 2016196354 | 12/2016 |
| WO | 2017062524 | 4/2017 |

* cited by examiner

HEAT TRANSFER SYSTEM

CROSS-REFERENCE TO RELATED APPLICATIONS

The present application claims priority of U.S. Provisional Patent Application No. 62/646,093, filed on Mar. 21, 2018, the contents of which is hereby incorporated by reference in its entirety.

BACKGROUND

The present disclosure relates to heat treatment of food. More specifically, the present disclosure relates to a heat transfer system for use in a broiler, oven, toaster, or the like to heat treat food for cooking, baking, or toasting a plurality of food items.

Heat transfer systems may be used to provide thermal energy to a broiler, oven, toaster, or the like for use in the heat treatment of food items to achieve cooking, baking, or toasting of the food item. Conveyor type systems move the food product in relation to a heat transfer system to achieve the desired effect. In the present disclosure, the exemplary embodiment of a broiler cooking a hamburger patty will be used, although it will be recognized that other forms of broilers, ovens, or toasters may be similarly configured and other foods, including, but not limited to pizza, pizza crusts, bread, buns, toasted sandwiches, chicken cuts or patties, fish cuts or patties, beef cuts or the aforementioned hamburger patties may be heat treated in the manners as described herein.

Currently available heat transfer systems used in the foodservice industry require a lot of energy so as to maintain a high base temperature eliminating the need for a food service worker to wait through a long warmup cycle before a food item is cooked. Similarly, heat transfer systems are typically slow to change regarding the cooking conditions delivered by the system and therefore are limited in ability to provide individualized cooking of food items.

U.S. Pat. No. 8,272,320 discloses a broiler, conveyor oven, and toaster system with a low-pressure air source connected to at least one air plenum disposed in an upper portion of a cooking chamber and having a plurality of air outlets for producing a focused forced air. A heating element or burner is disposed under the at least one air plenum and heat exchange pipes are disposed between at least two air plenums such that a curtain of focused forced air guides and directs heat from the heating element towards the food product being cooked.

BRIEF DISCLOSURE

An exemplary embodiment of a heat transfer system includes a heat source that operates to output heat. A mixing chamber includes a plurality of walls and surrounds the heat source. The mixing chamber receives a flow of pressurized air through an air inlet into the mixing chamber. The mixing chamber directs the flow of air received at the air inlet out of an outlet from the mixing chamber. The flow of air is directed past the heat source for direct heating of the flow of air by the heat source. The flow of air may be directed out of the outlet from the mixing chamber to impinge upon a food product.

The heat source may be a gas burner. The heat source may be an infrared (IR) emitter. The heat source may produce combustion gas. The flow of air entrains combustion gas produced by the heat source and the flow of air and the combustion gas are directed out of the outlet. In an embodiment, the heat transfer system further includes a nozzle that extends from the air inlet into the mixing chamber, a plenum wall that surrounds the heat source within the walls of the mixing chamber, and a Venturi through the plenum wall and positioned relative to the nozzle. The outlet from the mixing chamber extends from the plenum wall and the plurality of walls of the mixing chamber extend past the outlet in the plenum wall.

Exemplary embodiments of a broiler for cooking food include first and second heat transfer systems. Each of the heat transfer systems includes a heat source that operates to output heat and to produce combustion gas and a mixing chamber that includes a plurality of walls and surrounds the heat source. Each mixing chamber receives a flow of pressurized air through an air inlet into the mixing chamber. Each mixing chamber directs the flow of air received at the air inlet out of an outlet from the mixing chamber. The flow of air is directed past the heat source for direct heating of the flow of air by the heat source. The flow of air may be directed out of the outlet from the mixing chamber to impinge upon a food product. At least one source of pressurized air is connected to a respective air inlet of the first and second heat transfer systems. At least one conveyor is positioned relative to the first and second heat transfer systems. The outlets of the first and second heat transfer systems are directed at the at least one conveyor.

In exemplary embodiments of the broiler, the at least one source of pressurized air includes a plurality of blowers. A blower of the plurality is pneumatically connected to the air inlet of the respective first and second heat transfer systems. The flow of air through the mixing chamber entrains combustion gases produced by the heat source in the flow of air directed out of the outlet. The first heat transfer system may be arranged adjacent to the second heat transfer system and the first and second heat transfer systems are located on the same side of the at least one conveyor. The first heat transfer system may be arranged opposite from the second heat transfer system across at least one conveyor.

In further exemplary embodiments of the broiler, the broiler includes a third heat transfer system and a fourth heat transfer system. The third and fourth heat transfer systems each include a heat source that operates to output heat and to produce combustion gas and a mixing chamber that includes a plurality of walls and surrounds the heat source. Each mixing chamber receives a flow of pressurized air through an air inlet into the mixing chamber. Each mixing chamber directs the flow of air received at the air inlet out of an outlet from the mixing chamber. The flow of air is directed past the heat source for direct heating of the flow of air by the heat source. The flow of air may be directed out of the outlet from the mixing chamber to impinge upon a food product. The at least one conveyor further includes a first conveyor and a second conveyor and the first heat transfer system is arranged opposite from the third heat transfer system across the first conveyor and the second heat transfer system is arranged opposite from the fourth heat transfer system across the second conveyor.

In exemplary embodiments of the broiler a controller is communicatively connected to the first, second, third, and fourth heat transfer systems, the at least one source of pressurized air, and the first and second conveyors. The controller receives an identification of a food product to be cooked, accesses a cooking model based upon the identification of the food to be cooked, and provides control signals to the first, second, third, and fourth heat transfer systems and the at least one source of pressurized air based upon the model. A first sensor may be arranged intermediate the first heat transfer system and the second heat transfer system, and the sensor detects a condition of the food product. The controller may receive the detected condition of the food product from the first sensor. The controller calculates at least one adjustment to the cooking model and provides at least one control signal to adjust an operation of the second heat transfer system, the fourth heat transfer system, a second blower, a fourth blower, or the second conveyor. A second sensor may be arranged at a broiler inlet prior to the first heat transfer system and the second sensor provides the controller with a signal that identifies the food product or identifies an initial condition of the food product. At least one of the first sensor and the second sensor includes at least one of a temperature sensor, a density sensor, a humidity sensor, a volatile organic compound sensor, or a photo sensor.

DETAILED DISCLOSURE

Figure 1:
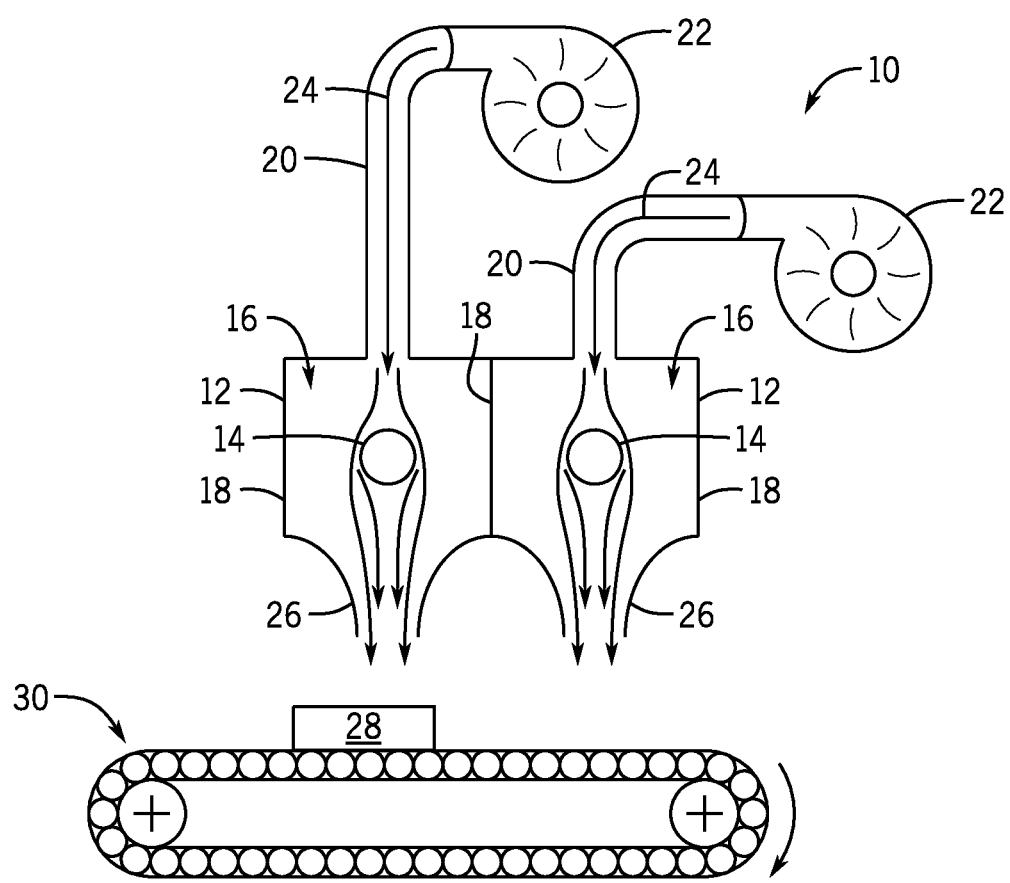
FIG. 1 depicts an exemplary embodiment of a conveyor broiler.

FIG. 1 depicts an exemplary embodiment of a broiler 10 with at least one heat transfer system 12. The broiler 10 depicted in FIG. 1 includes two adjacent heat transfer systems 12 although it will be recognized that in other embodiments more or fewer heat transfer systems may be incorporated. The heat transfer systems as exemplarily described herein include a heat source 14 that is a gas burner. It will be recognized that in other embodiments, the heat source 14 may exemplarily be an electric heating element or an infrared heating element, or another form of heating element as would be recognized by one of ordinary skill in the art.

The heat source 14 is surrounded by a mixing chamber 16. In an exemplary embodiment, the mixing chamber 16 is formed by a plurality of walls 18 constructed of sheet metal. An air inlet 20 is connected to the mixing chamber 16 and a blower 22 is connected to the air inlet 20. The blower 22 creates a positive pressure of gas, exemplarily ambient air taken from outside of the heat transfer system 12, and further for example outside of the broiler 10, and delivers a flow of pressurized air 24 into the mixing chamber 16. In the mixing chamber 16, the flow of pressurized air 24 mixes with and/or impinges upon the heat source 14 in a manner so as to heat the flow of pressurized air 24 directly from the heat source 14. The heated flow of pressurized air 24 is directed through an outlet 26 of the mixing chamber 16 onto a food product 28, for example, a hamburger patty. In embodiments, the heat source 14 may produce combustion gas from one or both of the combustion of fuel in a burner or from the localized heat produced by an electric and/or infrared heating element. In such embodiments, the flow of pressurized air 24 is directed past the heat source 14 and the combustion gasses from the heat source 14 are entrained in the flow of pressurized air 24. This combined flow of combustion gases and pressurized air is directed onto the food product 28. In an exemplary embodiment, the food product 28 is moved through the broiler 10 on a conveyor 30 relative to the one or more heat transfer systems 12. In embodiments, as will be described in further detail herein, one conveyor 30 may move the food product 28 relative to one or more heat transfer systems 12, while one or more further conveyors 30 move the food product 28 relative to one or more further heat transfer systems 12.

In the embodiment of the broiler 10 depicted in FIG. 1, the flow of pressurized air 24 from the blower 22 is heated directly from the heat source 14 itself and the hot combustion gasses produced by the heat source. Therefore upon ignition of the heat source 14 and the operation of blower 22, heated pressurized air and combustion gas is delivered through the outlet 26 with little or limited warmup or preheating time. In embodiments, this means that the broiler 10 can be held in a dwell, off, or low power condition until the broiler 10 is needed for cooking a piece of food. At that point, the heat transfer system 12 can be operated in a cooking operational condition and the blower 22 started to deliver the pressurized air to the mixing chamber 16. While the blower 22 has herein been disclosed as a blower, it will be recognized that other forms of compressors, pumps, or other sources of pressurized gas may be used instead of the blower 22 while remaining within the scope of the present disclosure.

Figure 2:
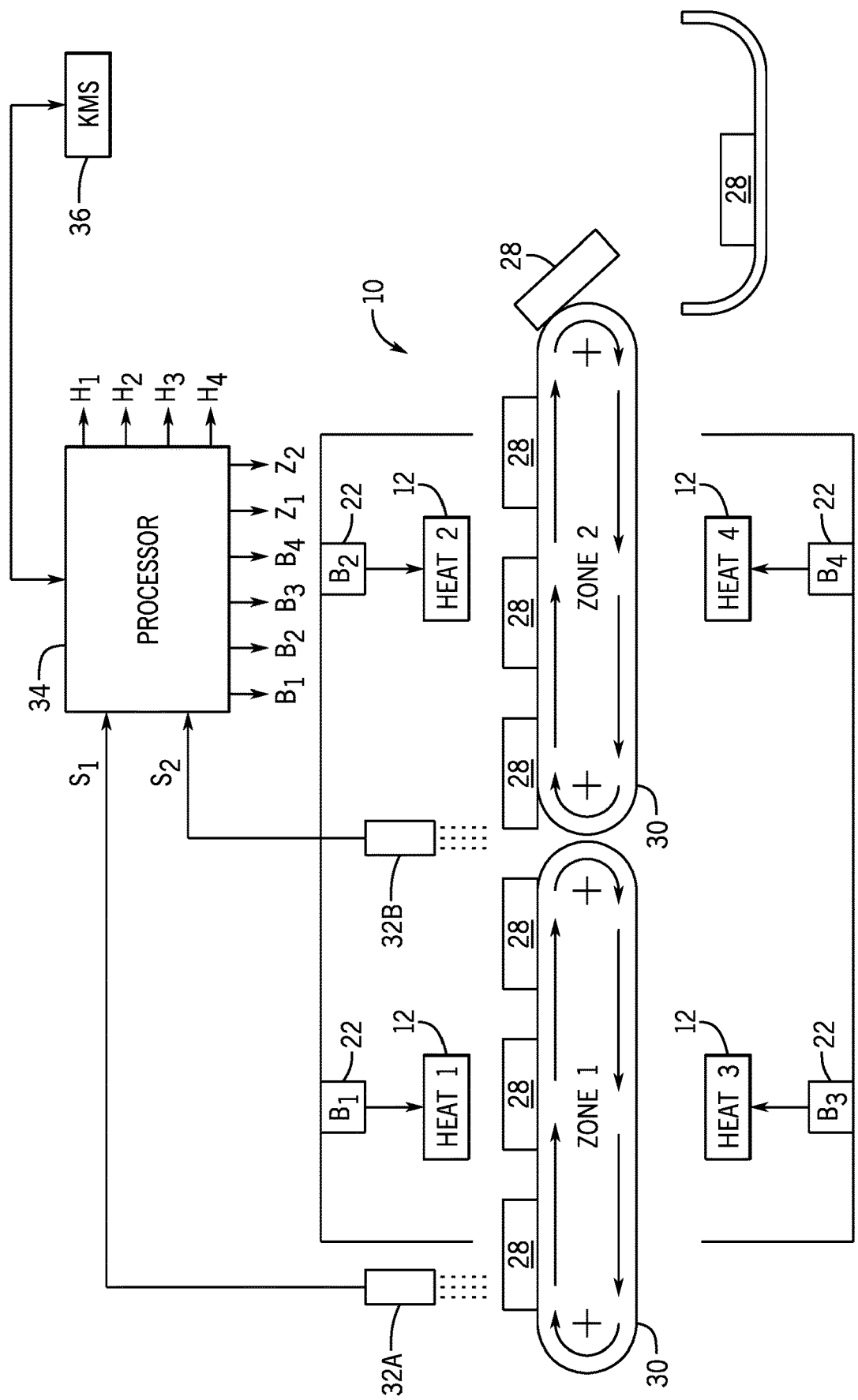
FIG. 2 depicts an exemplary embodiment of a heat transfer system with feedback sensing and control.
Figure 3B:
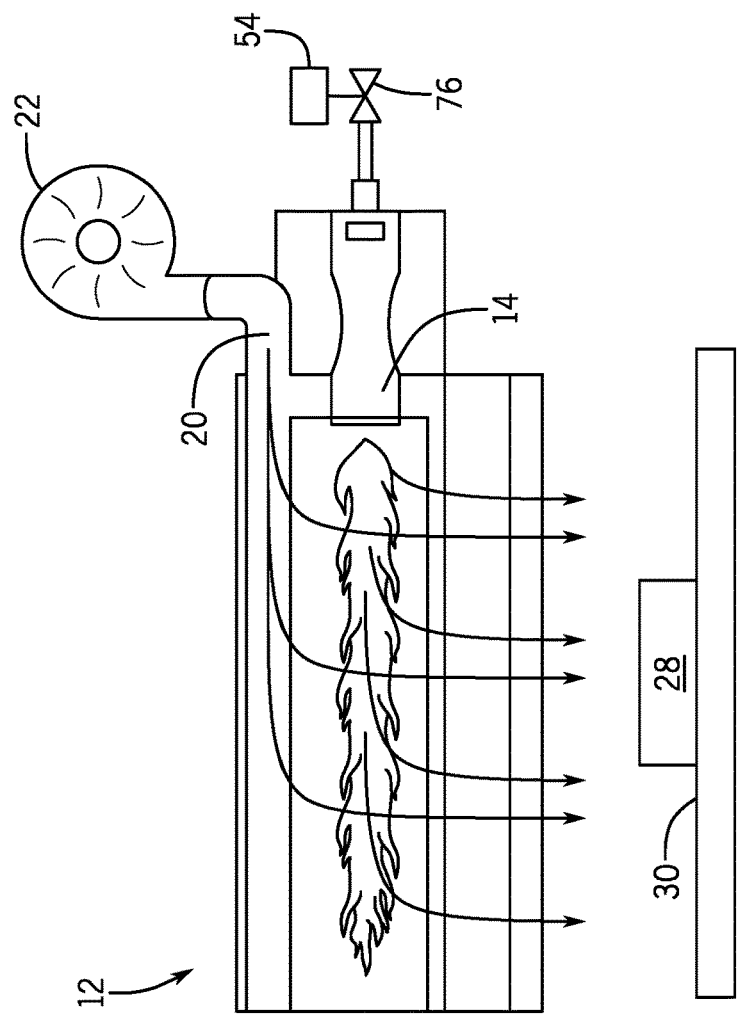
FIGS. 3A and 3B depict one example of a heat transfer system.
Figure 3A:
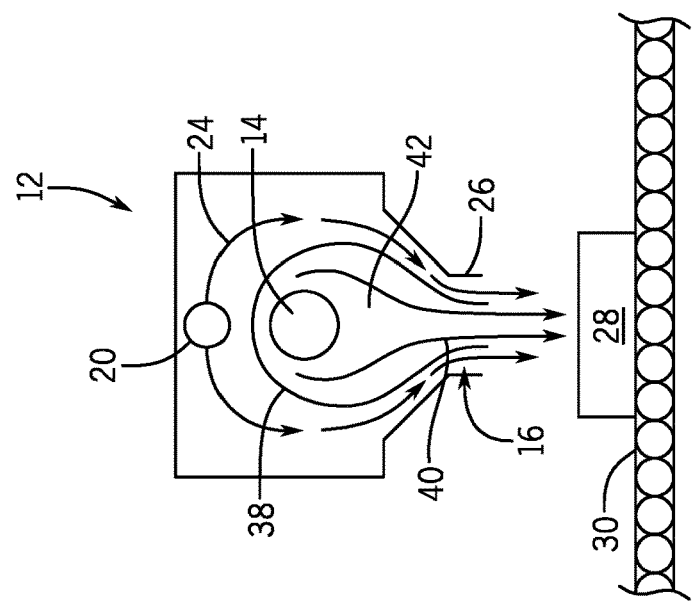

FIG. 2 depicts another exemplary embodiment of a broiler 10. It will be recognized that the broiler 10 of FIG. 2 is merely exemplary and other embodiments will fall within the scope of the present disclosure that include more or fewer components than depicted in FIG. 2. That is, a person of ordinary skill in the art will recognize from the present disclosure that the embodiment shown and described with respect to FIG. 2 may be modified or rearranged or implemented with more or fewer systems or components and arrive at an embodiment within the scope of the present disclosure.

The broiler 10 exemplarily includes multiple of many components and systems. Thus, it will be recognized from this disclosure that embodiments of the broiler 10 may include one, two, or more than two of these disclosed systems in a manner so as to provide in line heat treatment of food products. As described with respect to FIG. 1, the broiler 10 includes heat transfer systems 12, at least one conveyor 30, and blowers 22. In the exemplary embodiment depicted in FIG. 2, the broiler 10 includes two conveyors 30 arranged in series and representative of two zones of control, as will be described in further detail herein.

The broiler 10 also includes upper and lower heat transfer systems 12. The upper and lower heat transfer systems 12 are arranged on opposite sides of the conveyor 30 and are exemplarily arranged so as to provide heat treatment onto both sides of the food product 28 as it moves through the broiler 10. As depicted in FIG. 1, other embodiments may not include lower heat transfer systems and instead the heat transfer systems 12 may only be arranged on a single side of the food product 28. Additionally, the embodiment of the broiler 10 depicted in FIG. 2 includes a blower 22 associated with each of the heat transfer systems 12. It will be recognized that in another exemplary embodiment, one blower may be used for multiple heat transfer systems, or a single blower may be used to provide pressurized air to all of the heat transfer systems 12. However, for exemplary purposes, the broiler 10 is depicted with a blower 22 as individually associated with one of the heat transfer system 12.

The broiler 10 further includes sensors 32A and 32B. It will be recognized that more or fewer sensors may be used in association with other embodiments while remaining within the scope of the present disclosure. Additionally, the sensors 32A and 32B may comprise multiple sensors in a similar location within the broiler 10. It will be similarly recognized that the sensors 32A and 32B may be the same types of sensors or may be different types of sensors. In exemplary embodiments, the sensors may be temperature sensors, density sensors, photosensors or image capture sensors, volatile organic compound sensors, or humidity sensors. In embodiments, infrared sensors may be used to measure a surface temperature of a food product, acoustic sensors may be used to measure a density of a food product, and a camera may capture an image of a food product from which food product boundary, and thus an identification of the food product itself may be made or the color of the food product may be determined to evaluate the cooking state. These sensors provide their data to a controller 34. The controller 34 may be internal to the broiler 10 or may be external to the broiler 10. In an exemplary embodiment, the controller 34 is a computer processor that is located within the broiler 10, in a location shielded from the heat, humidity, and food particles of the broiler 10. In an alternative embodiment, the controller 34 is a computer located remotely from the broiler 10 and, for example, receives the sensor data either through wired or wireless communication and returns control signals as described in further detail herein through a similar communicative connection.

The broiler 10 of FIG. 2 provides an example of an adjustably controlled broiler wherein the broiler can create different and adaptive conditions within the broiler by providing individual control of each of the heat transfer systems 12, blowers 22, and conveyors 30 in order to produce the cooking or heat treatment on the food product moved through the broiler 10. The control of the heat transfer system 12 is exemplarily provided by control of the heat output of the heat source 14 within the heat transfer system 12. The individualized controls may be exhibited in a food cooking model used to operate the broiler to cook an identified food product.

As previously noted, the controller 34 may be a computer processor and is integral with or communicatively connected to a computer readable medium upon which computer readable code is stored that upon execution of the computer readable code by the processor, the processor performs the functions, calculations, and produces control signals as described in further detail herein. The same or another computer readable medium may be communicatively connected to the processor and cooking models stored thereon for access and use by the processor.

In an exemplary embodiment, upon receiving an identification of the food product 28 provided to the broiler 10 for cooking, the controller 34 selects a model that defines the blower speed/air pressure for each of the blowers, the intensity of operation of the heat source of the heat transfer system, and a speed of the conveyors. The controller 34 may receive the identification of the food product either from a user input (e.g. a button press) or through image recognition and processing of image data acquired of the food product before the food product enters the broiler, for example by sensor 32A. In another embodiment, the controller may receive the identification of the food product from a kitchen management system (KMS) 36 as described in further detail herein.

The customer order is exemplarily provided to the KMS 36 that identifies the components of each of the food products in the customer order and also exemplarily tracks, manages, and coordinates kitchen inventory and the order in which food products are processed, for example, with broiler 10. In doing so, the KMS 36 can provide control signals and information to the controller 34 of the broiler 10 and any other communication-enabled devices in the kitchen. In embodiments, the KMS 36 may be directly communicatively connected to the broiler 10 or may be communicatively connected to the broiler 10 through an internet-of-things (TOT) communications system which provides distributed communication to communication-enabled devices in the kitchen, including the broiler 10.

In such an embodiment, the models may operate the various components at different conditions, for example, to provide more or less heat at the top or bottom of the food product, control the speed of the conveyors to control the overall cooking time. Control of the conveyors 30 can determine the cooking time or time that the food product is exposed to particular conditions created by one or more heat transfer systems 12 adjacent the conveyors 30. Control of the heat transfer systems 12 includes control of the heat sources 14 to adjust the heat input into particular locations within the broiler. Control of the blowers 22 adjusts the flow of pressurized air through the heat transfer system and the air which impinges on the food product as it moves through the broiler 10. All of these components provide control over the cooking process and therefore can be changed to accurately and repeatedly cook different types of food.

The types of food cooked by a system as described herein may include raw, uncooked, par-baked, or frozen versions of food products, different food product sizes or weights, and a variety of different food products, including, but not limited to hamburgers, chicken breasts, bread, or pizza.

In an exemplary embodiment, a model for cooking a frozen hamburger patty may operate the first conveyor 30A through a first zone Z1 at a first speed to move the food product past the first and third heat transfer systems 12 to thaw the hamburger patty and start a cooking process. The first and third heat transfer systems 12 may operate with similar temperature and blower outputs. In an example, the first and third heat transfer systems 12 may operate at relatively lower temperature and increased blower speeds to promote thawing. The hamburger patty, now thawed and/or with the cooking process started, is transferred to the second conveyor 30B operating through a second zone Z2. The second conveyor 30B and second and fourth heat transfer systems 12 are operated to cook the hamburger patty. This may include relatively higher temperatures from the second and fourth heat transfer systems 12, and a speed of the second conveyor 30B that results in a desired cooking time in position between the second and fourth heat transfer systems.

In another example of a model, a pizza may be cooked by initially operating the third heat transfer system 12 with both of heat source 3 and blower 3 at a greater intensity relative to heat source 1 and blower 1 of the first heat transfer system to cook the crust. When the pizza is on the second conveyor 30B, the broiler may operate heat source 2 and blower 2 with an increased intensity relative to heat source 1 and blower 1. The operation of heat source 2 and blower 2 may be similar to, or to match that of heat source 4 and blower 4 to cook the toppings. The increased operation of heat sources 2 and 4 finish the pizza by browning the top and crust.

Figure 9:
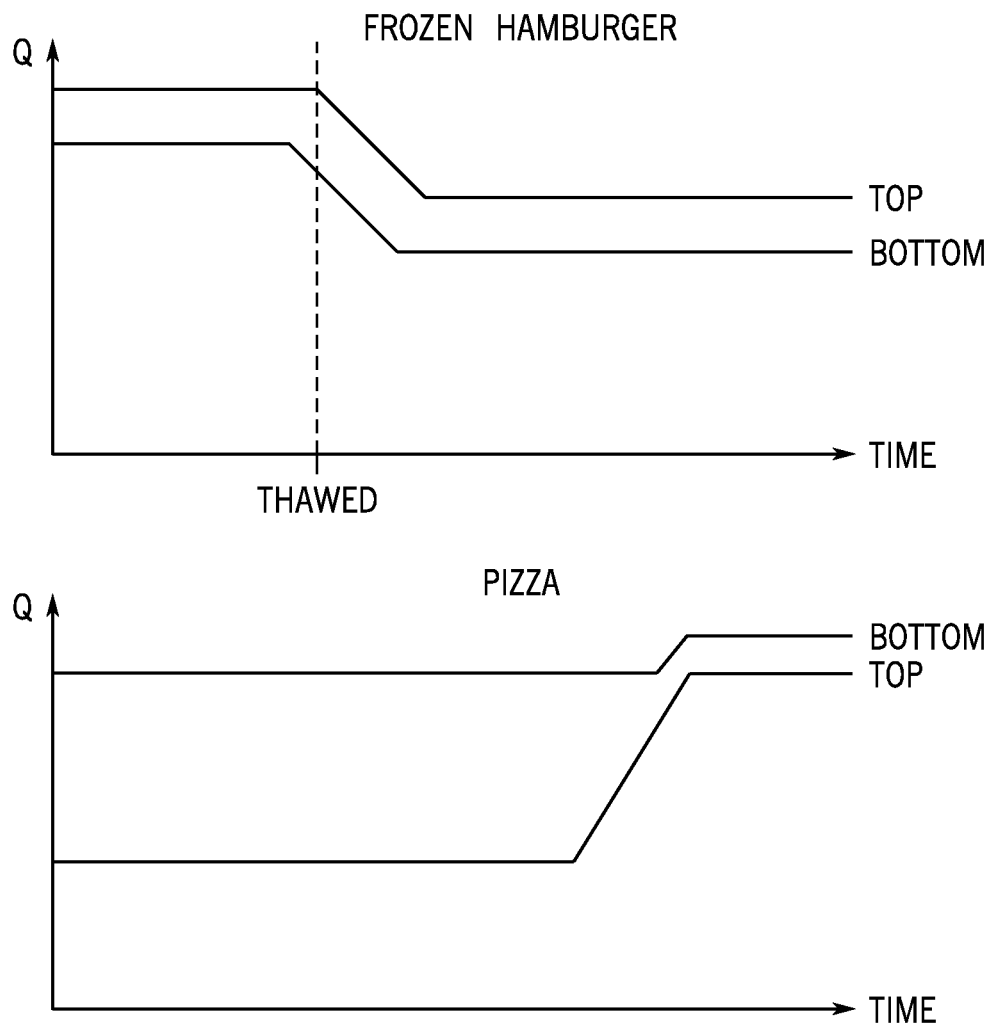
FIG. 9 depicts exemplary embodiments of food cooking models.

FIG. 9 graphically depicts exemplary embodiments of two food cooking models. Newton's Law of Cooling $Q=h \cdot A \cdot (T_w - T_{env})$ can be used to demonstrate the change in heat transfer to a target by manipulating the variables included in h, the heat transfer flow coefficient and T, the temperature of the air stream. Some of these variables are directly manipulated by changing the mass flow rate, temperature, and laminar or turbulent flow characteristics of the heated air stream. Increasing these variables causes an increase in h which increases the heat transfer at the surface of the target. Likewise, a decrease in these variables will decrease the heat transfer rate at the target surface.

The heat transfer rate can be increased and cooking speed can be decreased by increasing the temperature of the heat source and also the air flow rate. Some food products, for example, breads, are too fragile to withstand high rates of heat transfer so these variables would be decreased to cook the food without destruction of qualitative properties.

In addition to the operation of the broiler 10 based upon a stored food cooking model, embodiments of the broiler 10 described herein can be operated on a feedback control system so that the operation of components of the broiler are controlled to adjust the operation or conditions within the broiler in order to achieve a desired cooking result.

Figure 8:
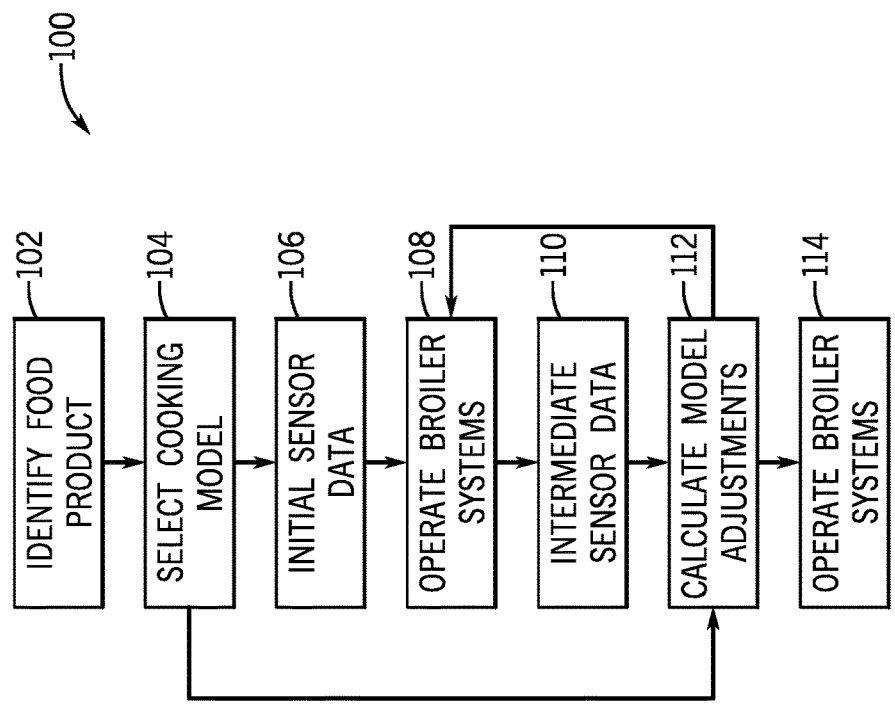
FIG. 8 is a flow chart that depicts an exemplary embodiment of a method of heat treatment.

FIG. 8 is a flow chart that depicts an exemplary embodiment of a method 100 of cooking, for example, using the broiler 10 depicted in FIG. 2. It will be recognized that the controller 34 may execute computer readable code as previously described to carry out the functions and perform the control operations as described in the performance of method 100. At 102, the food product is identified. The identification of the food product may, for example, be based upon a user input, an image capture processing to identify the food product, or the identification of the food product may come from the KMS 36 to which the controller is communicatively connected. Particularly in embodiments wherein the broiler 10 is one of a plurality of devices within a kitchen that are communicatively connected and operated in coordination, an identification of the food product may come from a computer centralized to the system to coordinate the operation of the kitchen devices, or may further come from a communication by a device operated to deliver the food product to the broiler.

Based upon the identity of the food product, at 104 a cooking model is selected. As described above, the cooking model may provide the timing, operation, and control of various components of the broiler, including, but not limited to the heat sources, blowers, and conveyors in a process designed to achieve a desired cooking result of the food product.

Next, at 106 initial sensor data is collected regarding the food product to be cooked. The initial sensor data may include product size, density, weight, temperature, or the like and these initial inputs used as variables in the selected cooking model to provide additional context and control for the operational values presented to each of the controlled components of the broiler 10, for example a heat intensity of each of the plurality of heaters, conveyor speeds for each of the conveyors, and blow target pressure/flow rate. It will be recognized that while the collection of the initial sensor data is presented herein at 106, such collection may be performed as part of identifying the food product at 102 or may be performed prior to selecting the cooking model at 104.

At 108, the controller operates the broiler components according to the initial sensor data and the selected cooking model. As noted above, this exemplarily includes operation of one or more of the heat sources to achieve a particular heat intensity, one or more of the blowers to produce a target flow rate of pressurized gas through the heat transfer system and operation of one or more of the conveyors to control the time that the food product is exposed to particular conditions within the broiler.

As previously described with respect to FIG. 2, the broiler then includes at least one intermediate sensor 32B positioned within the broiler to obtain intermediate sensor data that may include, but is not limited to food product surface temperature, color, humidity, density, release volatile organic compounds, or other sensed conditions. In a still further exemplary embodiment, one or more intermediate sensors may obtain an ambient temperature within the broiler 10. This intermediate sensor data is collected at 110 and for example, is located between heat transfer systems within the broiler. At 112 the intermediate sensor data is used to calculate one or more adjustments to the cooking model selected at 104. These adjustments calculated at 112 may come in a variety of forms. In one embodiment, the adjustment may be the selection of an alternative cooking model to reflect a change in a previous assumption made in the earlier model selection. In an alternative embodiment, the cooking model may include expected values for the intermediate sensor data. An error calculation may be made between the measured intermediate sensor data and the expected intermediate sensor data and one or more value adjustments or corrections made to the operation or control of systems in the broiler made based upon these adjustments.

In merely exemplary and non-limiting embodiments, the adjustments made may seek to increase heat source intensity, blower intensity, or decrease conveyor speed in the event of intermediate sensor data that indicates that the food product is less cooked than expected or to reduce heat source intensity, blower intensity or increase conveyor speed if the intermediate sensor data indicates a food product that is cooked more than expected. In embodiments, a combination of one or more of these adjustments may be made dependent upon the particular intermediate sensor data values obtained.

It will further be recognized that in embodiments, the calculated model adjustments at 112 may be used to make prospective adjustments, for example, to make adjustments to the operation of downstream components of the broiler in order to cook the food product that was sensed by the intermediate sensors to the target cooking conditions with the remaining processes of the broiler. The calculated model adjustments at 112 may also be used to make retrospective adjustments to the operation of the upstream components of the broiler so as to provide cooking conditions to feature cooked food products in an effort so that when those food products arrive at the intermediate sensors, the intermediate sensors detect a food product that is closer to the expected intermediate sensor data values.

In this manner, the broiler systems are operated at 114 according to the selected cooking model and the model adjustments calculated at 112 to complete the cooking process of the food product with the broiler.

In further exemplary embodiments of the method 100, the controls described above, and the model selections and/or adjustments are made on an item by item basis to provide food items cooked to different specifications, for example, to cook food items to different temperatures. In an exemplary embodiment, one food product may be cooked to a "medium" cooked temperature, while a subsequent food product may be cooked to a "well done" cooked temperature. In such an embodiment, the heat transfer system may operate to increase the thermal treatment of the second food product after the first food product has passed, while in another embodiment, the conveyor may be operated faster or slower to provide less thermal treatment to the first food product and more thermal treatment to the second food product. In a related embodiment, when the cooking model adjustments are calculated at 112 or carried out at 114, further adjustments may be made to provide differing thermal treatments to sequential food products. It is possible that if a first food product requires increased thermal treatment by a subsequent heat transfer system, that the next food product may require less overall thermal treatment it received additional energy from the increased treatment of the first food product.

FIGS. 3-6 all depict additional exemplary embodiments of heat transfer systems 12 as may be used with exemplary embodiments of the broiler as described herein. FIGS. 3A and 3B depict respective front and side views of an exemplary embodiment of a heat transfer system 12. In the embodiment depicted in FIGS. 3A and 3B, the heat transfer system 12 includes a plenum wall 38 positioned between the air inlet 20 and the heat source 14. This embodiment provides an initial heating of the flow of pressurized air 24 by indirect heat transfer exchange through the plenum wall 38 prior to the mixing chamber 16 which is located proximal the outlet 26 of the heat transfer system 12. The flow of pressurized air 24 is directed to flow past an outlet 40 of the plenum wall 38 which creates a low-pressure region at the outlet 40 that drives the combustion gas 42 away from the heat source 14 and into contact with the preheated flow of pressurized air 24. The combined flow of combustion gas 42 and pressurized air 24 exits the outlet 26 of the heat transfer system 12 and is directed onto the food product 28.

Figure 4:
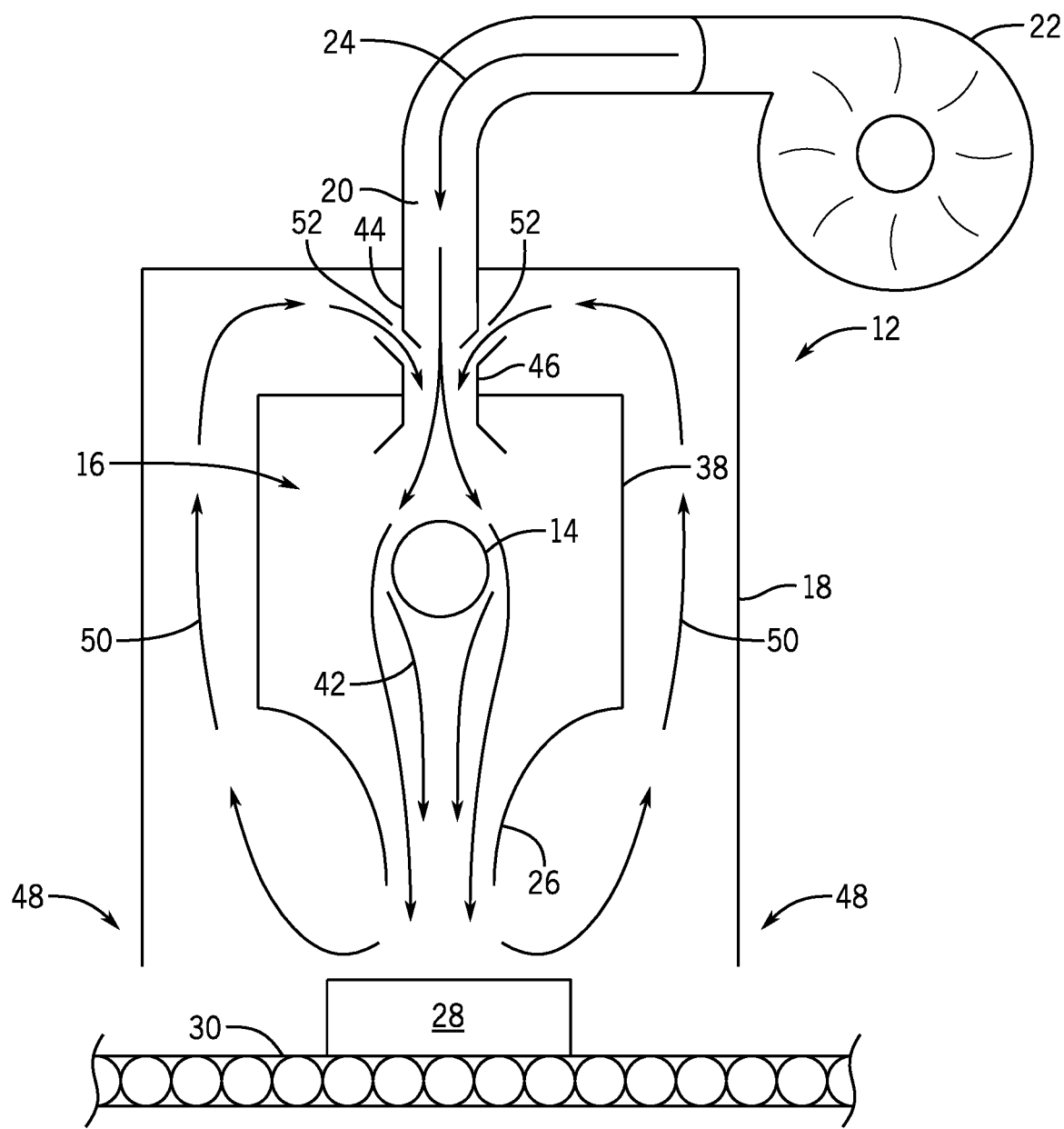
FIG. 4 depicts a further exemplary embodiment of a heat transfer system.

FIG. 4 depicts another exemplary embodiment of a heat transfer system 12. The heat transfer system 12 depicted in FIG. 4 also includes a plenum wall 38. However, in the heat transfer system depicted in FIG. 4, the air inlet 20 ends in a nozzle 44 proximate to a Venturi 46 through the plenum wall 38. This directs the flow of pressurized air 24 into the mixing chamber 16 about the heat source 14 to produce a combined flow of combustion gas 42 and flow of pressurized air 24 out the outlet 26 of the mixing chamber 16.

Further, in the heat transfer system 12 of FIG. 4, the walls 18 of the heat transfer system 12 include wall extensions 48 that bring the walls in proximity to the food product 28 in the region about the outlet 26. In this manner, a flow of recycled gas 50 is drawn away from the food product 28 after the combined flow of pressurized air and combustion gas has impinged upon the food product 28. The recycled gas 50 may also be drawn into the space between the plenum wall 38 and the wall 18 by a low pressure created by the venturi 46 as the flow of pressurized air 24 from the nozzle 44 is drawn through the venturi 46. In this manner, the flow of recycled gas 50 is drawn past the plenum wall 38 and receives thermal energy through secondary heat exchange with the plenum wall 38 and is drawn through gas inlet 52 through the venturi 46 and back into the mixing chamber 16 for further use in cooking food product. In this manner, an energy efficient heat transfer system may be provided.

Figure 5:
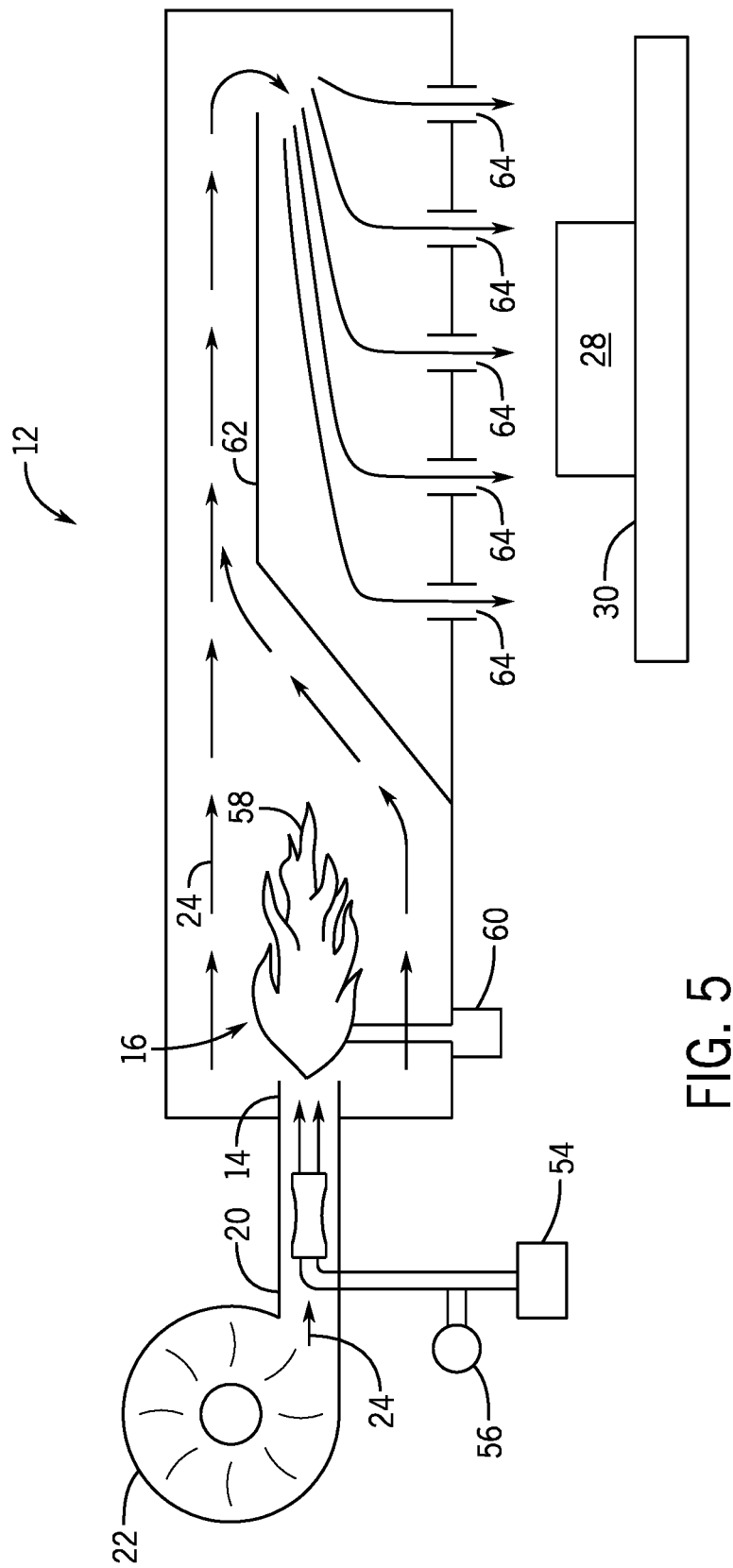
FIG. 5 depicts another exemplary embodiment of a heat transfer system.

FIG. 5 depicts a still further exemplary embodiment of a heat transfer system 12 in the embodiment depicted in FIG. 5, the blower 22 provides an air inlet 20 that is in line with or coaxial to the heat source 14 and the flow of pressurized air 24 flows past the heat source 14 in a mixing chamber 16 proximal the heat source 14. The heat transfer system 12 further exemplary depicts a gas combustion heat source with a gas source 54 and a pressure regulator 56 that regulates the pressure of the gas provided from the gas source 54 to the heat source 14 as shown in this embodiment, as well as other embodiments previously disclosed, the heat source 14 is a flame 58 provided by the combustion of the gas provided from the gas source 54. An ignition sensor 60 exemplarily provides a feedback signal indicating that the heat source 14 is producing the flame 58.

As previously described, the flow of pressurized air 24 mixes directly with the combustion gas produced by the flame 58 in the mixing chamber 16. In the embodiment depicted in FIG. 5, a baffle 62 directs the combined flow of combustion gas and heated pressurized air within the heat transfer system and through a plurality of outlets 64 arranged relative to the food product 28 on the conveyor 30.

Figure 6:
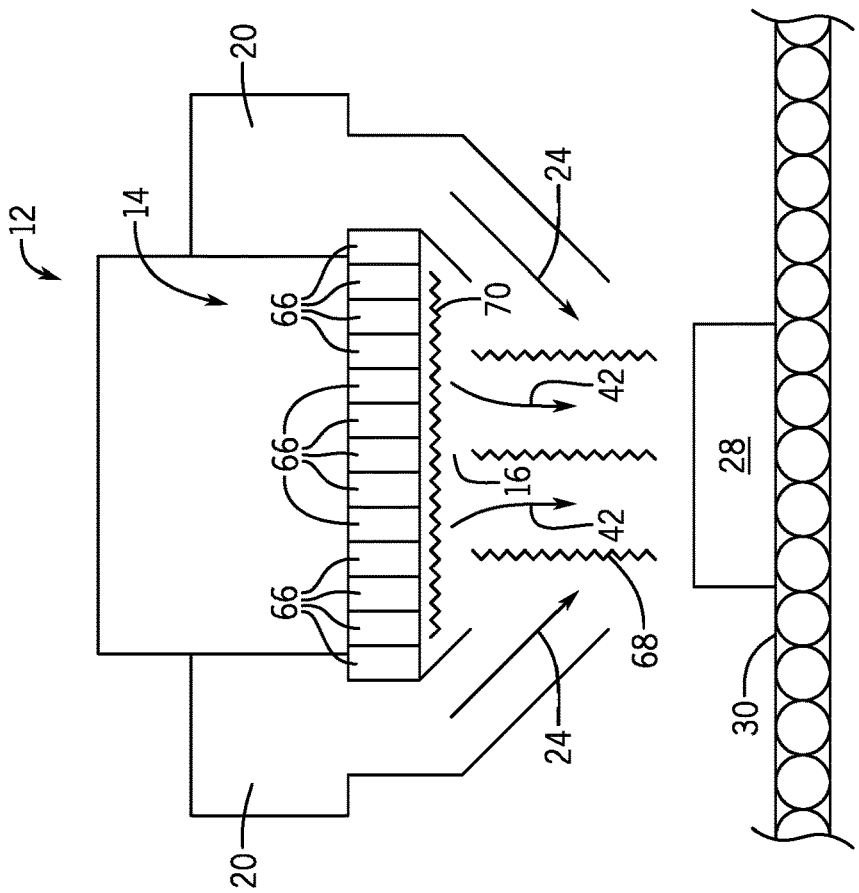
FIG. 6 depicts an additional exemplary embodiment of a heat transfer system using an infrared burner.

FIG. 6 depicts a still further exemplary embodiment of a heat transfer system 12. The heat transfer system depicted in FIG. 6 is an exemplary embodiment of a heat transfer system that uses an infrared (IR) element, for example, a plurality of IR ceramic tiles 66. As previously described, the heat source 14 may be any of a variety of heat sources, including, but not limited to gas burners, electrical elements, and IR elements. It will be recognized that the heat sources may be other types of electrical heat sources while remaining within the scope of the present disclosure, such electrical heat sources may include, but are not limited to heated quartz infrared sources or resistant wire "Calrod" sources. U.S. Pat. No. 7,800,023, entitled, "Conveyor Oven with Hybrid Heating Sources," provides additional examples of heat sources, and is incorporated by reference herein in its entirety.

In the embodiment of the heat transfer system 12 depicted in FIG. 6, the heat source 14 includes the plurality of ceramic tiles 66 which operate to produce IR energization 68 which is directed from the ceramic tiles 66 in the direction of the food product 28. However, the ceramic tiles 66 also produce a layer of combustion gas 70 in the vicinity of the ceramic tiles 66 that due to the intense heat of the ceramic tiles, which may exemplarily be 1800° F. The flows of pressurized air 24 provided by air inlets 20, which although not depicted are connected to blowers as previously described, a mixing chamber 16 in the vicinity of the ceramic tiles 66 and the combustion gas 70 to draw the combustion gas 70 into mixture with the flow of pressurized air to heat the pressurized air 24 with the combustion gas 70 and to direct the combined flow of pressurized air 24 and the combustion gas 42 to the food product 28.

Figure 7:
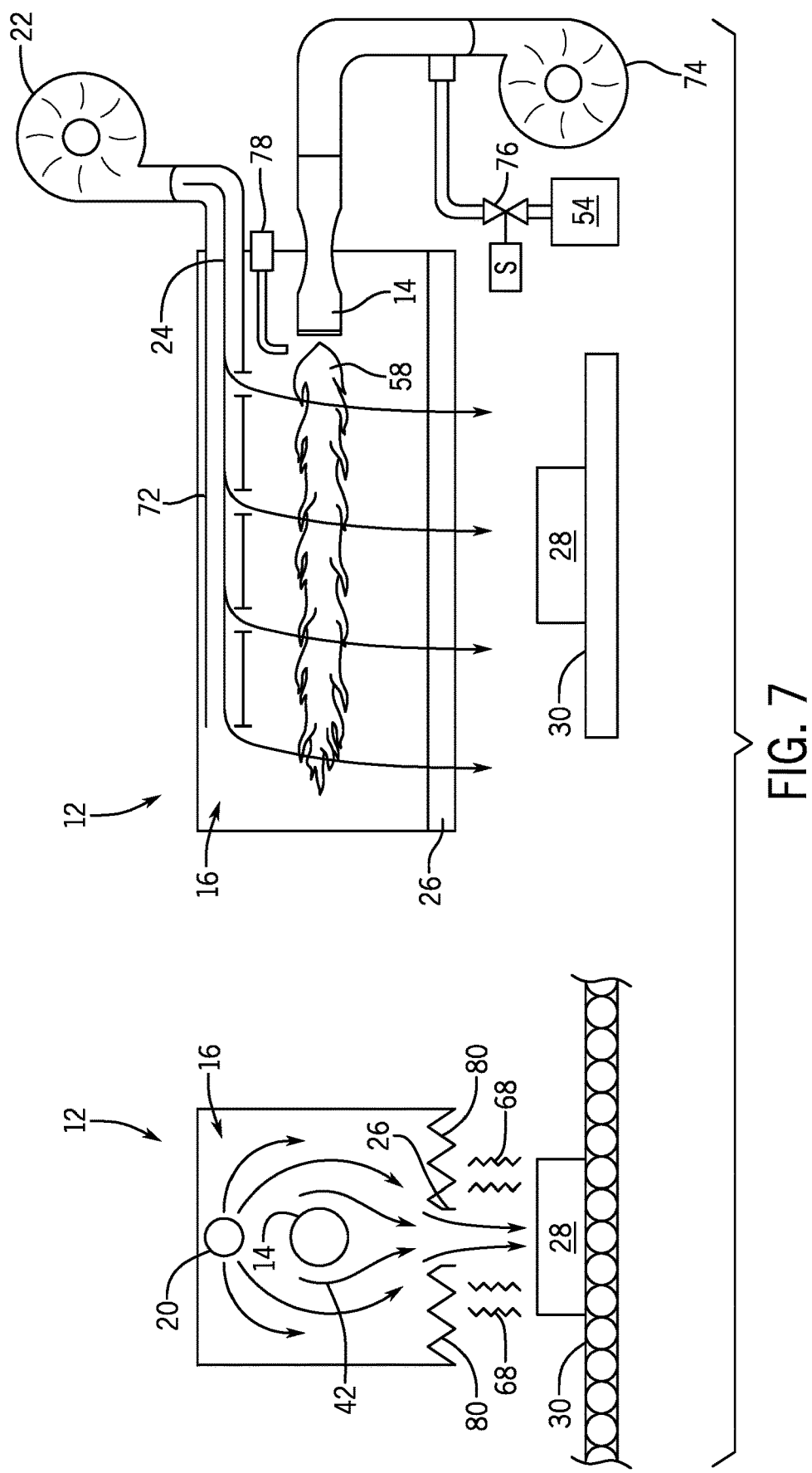
FIG. 7 depicts an exemplary embodiment of a heat transfer system with a secondary radiant heat source.

FIG. 7 depicts an exemplary embodiment of a heat transfer system 12 with a secondary radiant heat source. The heat transfer system 12 of FIG. 7 includes an air inlet 72 connected to the blower 22 that provides a flow of pressurized air 24 into the mixing chamber 16. A heat source 14 which is exemplarily a flame 58 is produced from the ignition of gas from a gas source 54. The gas from the gas source 54 is delivered to the heat source 14 by entrainment of the gas in a flow of air produced by a combustion blower 74. A gas control valve 76 is operated to control the amount of gas provided for combustion. When the gas is delivered entrained in a flow of pressurized air, it is ignited by a spark flame 78 to produce the flame 58.

The elongated air inlet 72 provides the flow of pressurized air 24 into the mixing chamber 16 along the entire length of the mixing chamber 16 and therefore the heat transfer system 12. As shown in cross-section, the flow of pressurized air 24 mixes with the combustion gas 42. However, the mixing chamber 16 is only provided with a narrow, central outlet 26. Therefore, the heated gasses, as well as radiant energy from the flame 58 heat a radiant surface 80 positioned between the heat source 14 and the conveyor 30 transporting the food product 28 to be cooked. The outlet 26 is exemplarily located within the radiant surface 80. The radiant surface 80 his heated by the heat energy of the heat transfer system 12 and projects radiant heat energy down onto the food 28 on the conveyor 30. The radiant heat energy adds to the cooking performed by the impingement of the heated pressurized air and combustion gas onto the food, and helps to further cook the food between outlets 26.

Embodiments, as described herein, may provide a further benefit over existing broiler systems as the heat source is contained within the mixing chamber and thus protected from the debris and cooking vapors caused by cooking the food within the broiler. In systems that use a combustion burner and/or an electrical heating element, contact with food grease, debris, or vapor can create areas of weakness thereon, which can result in failure and eventual replacement of the burner or heating element. In the embodiments described herein, the heat source is located within the mixing chamber and the heated flow of air and combustion gas is projected out of the opening therein. The combination of the outward flow of air and the reduced area of the opening, limit any grease, debris, or cooking vapors from entering the mixing chambers and contacting the heat source.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A broiler for cooking a food product, the broiler comprising:
   first and second heat transfer systems, each of the first and second heat transfer systems comprising:
      a heat source that operates to output heat;
      a mixing chamber comprising a plurality of walls and surrounding the heat source;
      an air inlet into the mixing chamber through which the mixing chamber receives a flow of pressurized air; and
      an outlet from the mixing chamber, wherein the mixing chamber directs the flow of air received at the air inlet past the heat source for direct heating of the flow of air by the heat source and directs the flow of air out of the outlet from the mixing chamber to impinge upon a food product;
   at least one source of pressurized air connected to respective air inlets into the mixing chambers of the first and second heat transfer systems; and
   at least one conveyor positioned relative to the first and second heat transfer systems, wherein the outlets of the first and second heat transfer systems are directed at the at least one conveyor.

2. The broiler of claim 1, wherein the at least one source of pressurized air comprises a plurality of blowers, with a blower of the plurality pneumatically connected to the air inlet of the respective first and second heat transfer systems.

3. The broiler of claim 1, wherein the heat sources of the first and second heat transfer systems produce combustion gases and the flow of air through the mixing chambers entrain the combustion gases produced by the heat sources in the flows of air directed out of the outlets.

4. The broiler of claim 1, wherein the first heat transfer system is arranged adjacent to the second heat transfer system, and the first heat transfer system is located on the same side of the at least one conveyor as the second heat transfer system.

5. The broiler of claim 1, wherein the first heat transfer system is arranged opposite from the second heat transfer system across the at least one conveyor.

6. The broiler of claim 1, wherein the heat sources of the first and second heat transfer systems are gas burners and the gas burners produce combustion gas.

7. A broiler for cooking a food product, the broiler comprising:
   first and second heat transfer systems, each of the first and second heat transfer systems comprising:
      a heat source that operates to output heat;
      a mixing chamber comprising a plurality of walls and surrounding the heat source;
      an air inlet into the mixing chamber through which the mixing chamber receives a flow of pressurized air; and
      an outlet from the mixing chamber, wherein the mixing chamber directs the flow of air received at the air inlet past the heat source for direct heating of the flow of air by the heat source and directs the flow of air out of the outlet from the mixing chamber to impinge upon a food product;
   third and fourth heat transfer systems, each of the third and fourth heat transfer systems comprising:
      a heat source that operates to output heat;

a mixing chamber comprising a plurality of walls and surrounding the heat source;

an air inlet into the mixing chamber through which the mixing chamber receives a flow of pressurized air; and an outlet from the mixing chamber, wherein the mixing chamber directs the flow of air received at the air inlet past the heat source for direct heating of the flow of air by the heat source and directs the flow of air out of the outlet from the mixing chamber to impinge upon a food product;

at least one source of pressurized air connected to a-respective air inlets of the first, second, third, and fourth heat transfer systems; and a first conveyor and a second conveyor and the first heat transfer system is arranged opposite from the third heat transfer system across the first conveyor, the outlets of the first third heat transfer systems directed towards the first conveyor and the second heat transfer system is arranged opposite from the fourth heat transfer system across the second conveyor, the outlets of the second and fourth heat transfer systems directed towards the second conveyor.

8. The broiler of claim 7, further comprising a controller communicatively connected the first, second, third, and fourth heat transfer systems, the at least one source of pressurized air, and the first and second conveyors, wherein the controller receives an identification of a food product to be cooked, accesses a cooking model based upon the identification of the food to be cooked, and provides control signals to the first, second, third, and fourth heat transfer systems, the at least one source of pressurized air based upon the model.

9. The broiler of claim 8, further comprising a first sensor arranged intermediate the first heat transfer system and the second heat transfer system, wherein the sensor detects a condition of the food product.

10. The broiler of claim 9, wherein the controller receives the detected condition of the food product from the first sensor, the controller calculates at least one adjustment to the cooking model and provides at least one control signal to adjust an operation of the second heat transfer system, the fourth heat transfer system, a second blower, a fourth blower or the second conveyor.

11. The broiler of claim 10, further comprising a second sensor arranged at a broiler inlet prior to the first heat transfer system and the second sensor provides the controller with a signal that identifies the food product or identifies an initial condition of the food product.

12. The broiler of claim 11, wherein at least one of the first sensor and the second sensor comprises at least one of a temperature sensor, a density sensor, a humidity sensor, a volatile organic compound sensor, or a photo sensor.

13. The broiler of claim 7, wherein the heat sources of the first, second, third, and fourth heat transfer systems produce combustion gases and the flow of air through the mixing chambers entrain the combustion gases produced by the heat sources in the flows of air directed out of the outlets.

14. The broiler of claim 7, wherein the heat sources of the first, second, third, and fourth heat transfer systems are gas burners.

15. The broiler of claim 7, wherein at least one of the first, second, third, or fourth heat transfer systems further comprises:

a nozzle that extends from the air inlet into the mixing chamber;

a plenum wall surrounding the heat source within the walls of the mixing chamber, wherein the outlet from the mixing chamber extends from the plenum walls; and a Venturi through the plenum wall and positioned relative to the nozzle to receive the flow of pressurized air from the nozzle into the mixing chamber;

wherein the plurality of walls of the mixing chamber extend past the outlet in the plenum wall.

16. The broiler of claim 7, wherein the heat source of at least one of the first, second, third, or fourth heat transfer systems is an electric burner.

17. The broiler of claim 1, wherein at least one of the first or second heat transfer systems further comprises:

a nozzle that extends from the air inlet into the mixing chamber;

a plenum wall surrounding the heat source within the walls of the mixing chamber, wherein the outlet from the mixing chamber extends from the plenum walls; and a Venturi through the plenum wall and positioned relative to the nozzle to receive the flow of pressurized air from the nozzle into the mixing chamber;

wherein the plurality of walls of the mixing chamber extend past the outlet in the plenum wall.

18. The broiler of claim 1, wherein the heat source of at least one of the first or second heat transfer systems is an electric burner.

* * * * *